US009349044B2

(12) United States Patent
Joo et al.

(10) Patent No.: US 9,349,044 B2
(45) Date of Patent: May 24, 2016

(54) GESTURE RECOGNITION APPARATUS AND METHOD

(71) Applicant: Hyundai Motor Company, Seoul (KR)

(72) Inventors: Sihyun Joo, Seoul (KR); Jongmin Oh, Ulsan (KR); Jungsang Min, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/470,260

(22) Filed: Aug. 27, 2014

(65) Prior Publication Data

US 2015/0186717 A1 Jul. 2, 2015

(30) Foreign Application Priority Data

Dec. 31, 2013 (KR) ........................ 10-2013-0168912

(51) Int. Cl.
*G06K 9/00* (2006.01)
(52) U.S. Cl.
CPC ........ *G06K 9/00389* (2013.01); *G06K 9/00832* (2013.01); *G06K 9/00335* (2013.01)
(58) Field of Classification Search
None
See application file for complete search history.

(56) References Cited

U.S. PATENT DOCUMENTS

| | | | | |
|---|---|---|---|---|
| 2010/0110384 | A1* | 5/2010 | Maekawa | G02B 5/124 353/10 |
| 2013/0261871 | A1 | 10/2013 | Hobbs et al. | |
| 2013/0271397 | A1* | 10/2013 | Macdougall | G06F 3/0304 345/173 |
| 2014/0168062 | A1* | 6/2014 | Katz | G06F 3/017 345/156 |
| 2014/0277936 | A1* | 9/2014 | El Dokor | G06F 3/017 701/36 |
| 2015/0220749 | A1* | 8/2015 | Cronholm | G06K 9/00355 726/30 |

FOREIGN PATENT DOCUMENTS

JP 2013-196047 A 9/2013

OTHER PUBLICATIONS

Sodhi et al. "AIREAL: Interactive Tactile Experiences in Free Air." ACM Transactions on Graphics, SIGGRAPH 2013 Conference Proceedings, vol. 32, issue 4, article No. 134, Jul. 2013, 10 pages.*

* cited by examiner

*Primary Examiner* — Jon Chang
(74) *Attorney, Agent, or Firm* — Mintz Levin Cohn Ferris Glovsky and Popeo, P.C.; Peter F. Corless

(57) ABSTRACT

A gesture recognition apparatus and method are provided. The gesture recognition apparatus includes an imaging device that is configured to photograph a gesture recognition region and generate image information and a distance sensor that is configured to sense a particular object that approaches a gesture start position. A controller is configured to enter a gesture input mode when the particular object is located at the gesture start position for a predetermined time and recognize a gesture by detecting the particular object based on the image information. Further, the controller is configured to provide feedback that indicates whether the particular object is located at the gesture start position and feedback that indicates whether the particular object is located in the gesture recognition region in the input mode.

11 Claims, 6 Drawing Sheets

GESTURE RECOGNITION APPARATUS AND METHOD

CROSS-REFERENCE TO RELATED APPLICATION

This application claims priority to and the benefit of Korean Patent Application No. 10-2013-0168912 filed in the Korean Intellectual Property Office on Dec. 31, 2013, the entire contents of which are incorporated herein by reference.

BACKGROUND (a) Field of the Invention

The present invention relates to a gesture recognition apparatus and method. More particularly, the present invention relates to a gesture recognition apparatus and method for a vehicle.

(b) Description of the Related Art

Generally, a vehicle information device is a device that provides assistance for driving of a vehicle or convenience and entertainment of a passenger. For example, the vehicle information device includes an audio video navigation system, a telematics system, and the like. Recently, some of the vehicle information devices have been operated by a remote control method to prevent a driver's eyes from deviating from a road in front of a vehicle to operate buttons of the information devices while driving.

An exemplary developed remote control method includes controlling the vehicle information device using a button disposed on a steering wheel, recognizing a user's gesture, and the like. Among the developed methods, the method for recognizing a user's gesture is a method for photographing a user's hand using an imaging device (e.g., a camera) and using a motion of the user's hand as an intuitive button by analyzing the photographed image. However, an unexpected gesture may be input when vibration is generated while traveling and the user's hand is moved to operate various buttons disposed within the vehicle. To prevent such erroneous operations, a method of activating a gesture recognition apparatus using an additional button provided for starting a gesture input, a defined motion such as shaking the user's hand, or the like has been used. However, when using the additional button or the defined motion while driving the vehicle, it may be difficult for the driver to input a gesture at a desired time and the driver's attention may be distracted.

The above information disclosed in this section is merely for enhancement of understanding of the background of the invention and therefore it may contain information that does not form the prior art that is already known in this country to a person of ordinary skill in the art.

SUMMARY

The present invention provides a gesture recognition apparatus having advantages of starting gesture recognition without additional buttons or motions by determining whether a user's hand is located at a gesture start position.

An exemplary embodiment of the present invention provides a gesture recognition apparatus for indicating whether a gesture input is normally performed by providing tactile feedback to the user's hand when the user's hand is located at the gesture start position or moves in a gesture recognition region.

A gesture recognition apparatus according to an exemplary embodiment of the present invention may include: an imaging device configured to photograph a gesture recognition region and generate image information; a distance sensor configured to sense a user's hand that approaches a gesture start position (e.g., sense an approach to a gesture start position); a controller configured to enter a gesture input mode when the user's hand is located at the gesture start position for a predetermined time (e.g., in response to determining the approach at the gesture start position), and recognize a gesture by detecting the user's hand based on the image information; and a feedback device configured to provide feedback that indicates whether the user's hand is located at the gesture start position and feedback that indicates whether the user's hand is located in the gesture recognition region in the input mode.

The gesture recognition region may be set to have a predetermined size with reference to a gearshift knob. The imaging device may include a camera disposed to face the gearshift knob. The gesture start position may be spaced apart from an upper portion of the gearshift knob in a vertical direction by a predetermined distance. The distance sensor may be disposed at an upper portion at an upper portion of the gearshift knob.

The feedback device may include one or more air jet devices configured to jet (e.g., output) air toward the user's hand to provide tactile feedback. The air jet devices may be disposed separately from each other around the gearshift knob based on a size of a jet region where the air is jetted or output. A jet amount and a jet period of the air for indicating the gesture start position may be different from the jet amount and the jet period of the air for indicating the gesture recognition region. The feedback device may be configured to jet the air along a moving path of the user's hand located in the gesture recognition region. The gesture recognition apparatus may further include a lighting device configured to irradiate t toward the user's hand. The controller may be configured to determine whether the user's hand is located at the gesture start position using image information of the imaging device and distance information of the distance sensor.

According to an exemplary embodiment of the present invention, the gesture recognition may be started without additional buttons or motions by determining whether the user's hand is located at the gesture start position. Further, the tactile feedback may be provided to the user's hand when the user's hand is located at the gesture start position or moves in the gesture recognition region, such that the user may recognize whether a gesture input is normally performed (e.g., whether an erroneous input is performed or not).

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
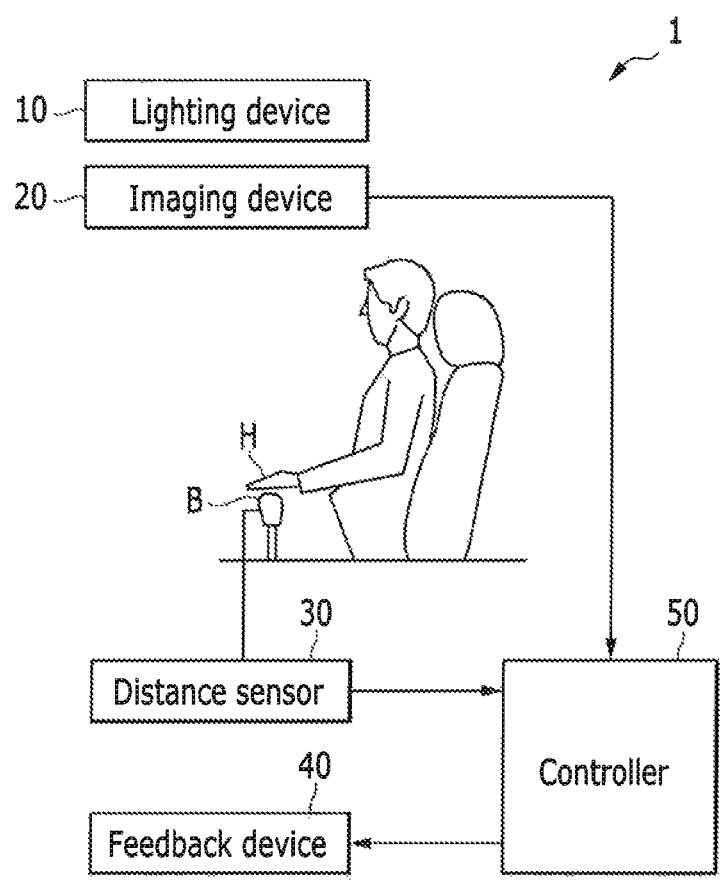
FIG. 1 and FIG. 2 are exemplary diagrams illustrating a gesture recognition apparatus according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media containing executable program instructions executed by a processor, controller/control unit or the like. Examples of the computer readable media include, but are not limited to, ROM, RAM, compact disc (CD)-ROMs, magnetic. tapes, floppy disks, flash drives, smart cards and optical data storage devices. A computer readable recording medium can also be distributed in network coupled computer systems so that instructions on the computer readable recording medium are stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

In the following detailed description, only certain exemplary embodiments of the present invention have been shown and described, simply by way of illustration. As those skilled in the art would realize, the described exemplary embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply he inclusion of stated elements but not the exclusion of any other elements.

Figure 2:
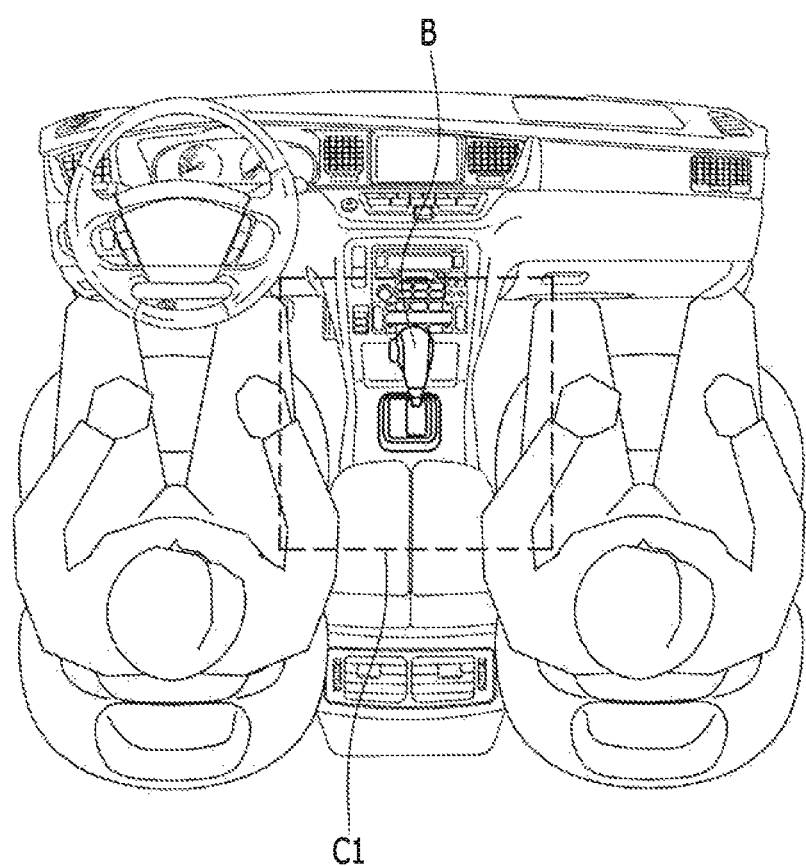

Hereinafter, an exemplary embodiment, which those skilled in the art may easily implement, will be described in detail with reference to the accompanying drawings. FIG. 1 and FIG. 2 are exemplary diagrams illustrating a gesture recognition apparatus according to an exemplary embodiment of the present invention, and FIG. 3A, FIG. 3B, FIG. 4A, and FIG. 4B are exemplary drawings describing a feedback device illustrated in FIG. 1. As shown in FIG. 1 and FIG. 2, a gesture recognition apparatus 1 according to an exemplary embodiment of the present invention may include a lighting device 10, an imaging device 20, a distance sensor 30, a feedback device 40, and a controller 50. The controller 50 may be configured to operate the lighting device 10, the imaging device 20, the distance sensor 30, and the feedback device 40.

The lighting device 10 may be configured to irradiate light toward a user's hand H or a particular object (e.g., toward an approach and the approach may be a hand or a particular object) when an illuminance level in a vehicle is less than a predetermined level. The lighting device 10 may include a lighting device configured to irradiate infrared rays when the imaging device 20 includes an infrared camera, and may include a lighting device configured to irradiate visible rays when the imaging device 20 includes a red-green-blue (RGB) camera. The imaging device 20 may be configured to photograph (e.g., capture) the user's hand H in a gesture recognition region C1 and generate image information. Herein, the gesture recognition region C1 may be set to have a predetermined size with reference to a gearshift knob B. The imaging device 20 may include the infrared camera, the ROB camera, or the like disposed to face the gearshift knob B.

The distance sensor 30 may be configured to sense the user's hand H. Various sensors such as an ultrasonic wave sensor, an illuminance sensor, or the like may be used as the distance sensor 30. The distance sensor 30 may be disposed at an upper portion of the gearshift knob B, and may be configured to sense the user's hand approaching the gearshift knob B. The feedback device 40 may be configured to provide feedback indicating whether the user's hand H or the particular object is located at a gesture start position and feedback indicating whether the user's hand H or object is located in the gesture recognition region C1. In particular, the feedback device 40 may be configured to provide tactile feedback to the user's hand H when the user's hand H is located at the gesture start position or moves in the gesture recognition region C1.

Figure 3A:
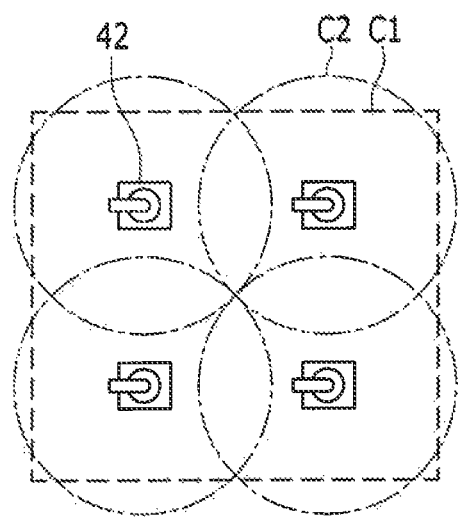
FIG. 3A, FIG. 3B, FIG. 4A, and FIG. 4B are exemplary diagrams describing a feedback device illustrated in FIG. 1 according to an exemplary embodiment of the present invention.
Figure 3B:
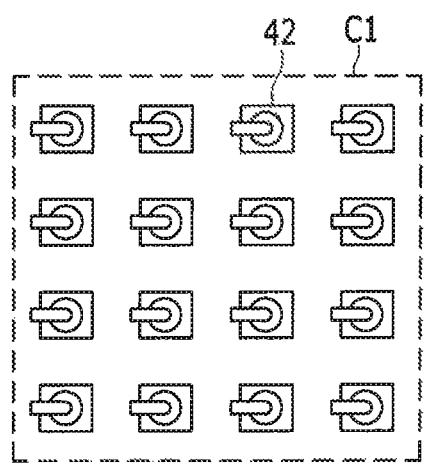

Accordingly, the feedback device 40 may include one or more air jet devices 42 configured to jet air or output air toward the user's hand H or the particular object located in the gesture recognition region C1. Herein, the number and arrangement of the air jet devices 42 may be adjusted based on sizes of the gesture recognition region C1 and jet regions C2 of the air jet devices 42. For example, as shown in FIG. 3A, when the air jet devices 42 are configured to adjust an air jet direction via a motor or the like, four air jet devices 42 may be disposed in the gesture recognition region C1 in consideration of sizes of the jet region C2 where the air is jetted or output. Additionally, as shown in FIG. 3B, when the air jet devices 42 are not configured to adjust the air jet direction, sixteen air jet devices 42 may be disposed in an array form in the gesture recognition region C1.

Figure 4A:
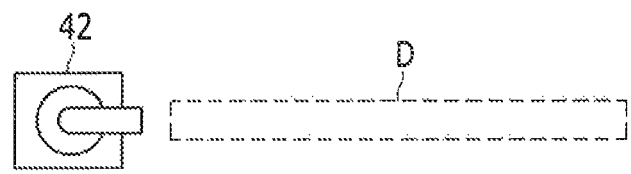
Figure 4B:
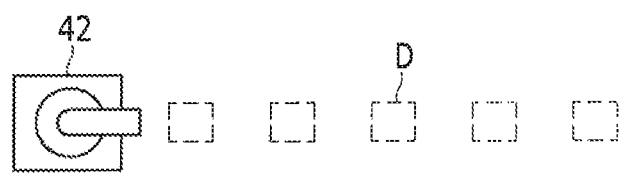

A jet amount and a jet period of the air may be varied by a person of ordinary skill in the art. In other words, the jet amount and the jet period of the air for indicating the gesture start position may be different from the jet amount and the jet period of the air for indicating the gesture recognition region C1. For example, as shown in FIG. 4A, the air jet devices 42 may be configured to jet or output the air D for a relatively long period (e.g., for a predetermined period of time) when the user's hand H or the object is located at the gesture start position. In addition, as shown in FIG. 4B, the air jet devices may be configured to jet or output the air D for a relatively short period (e.g., for less than a predetermined period of time) when the user's hand H or the particular object is in the gesture recognition region C1 and performs a gesture. Accordingly, the user may recognize whether a gesture input mode is activated when the user's hand is correctly located at the gesture start position, and whether the gesture is performed in the gesture recognition region.

The controller 50 may be implemented with one or more microprocessors executed by a predetermined program. The predetermined program may include a series of commands for performing each step included in a method for recognizing the gesture according to an exemplary embodiment of the present invention. The controller 50 may be configured to determine whether to enter the gesture input mode according to a position of the user's hand or the particular object sensed by the distance sensor 30, and may be configured to activate the feedback device 40. The controller 50 may be configured to receive image information from the imaging device 20 in the gesture input mode, and recognize the gesture by detecting the user's hand H or the particular object from the image information.

In particular, the controller 50 may be configured to determine whether the user's hand or the particular object is located at the gesture start position, and enter the gesture input mode when the user's hand H or the particular object is located at the gesture start position for a predetermined time. Herein, the gesture start position may be spaced apart from an upper portion of the gearshift knob B in a vertical direction by a predetermined distance. The controller 50 may be configured to not enter the gesture input mode (e.g., remain in a standby mode) when an object located at the gesture start position is not the user's hand or the particular object. When only distance information of the distance sensor 30 is used, whether the object located at the gesture start position is the user's hand H or a particular object may not be determined. Meanwhile, when the image information of the imaging device 20 and the distance information of the distance sensor 30 are used simultaneously, whether the user's hand or the particular object is located at the gesture start position may be determined.

The gesture input mode may be maintained in an inactivation state when the user's hand H or the particular object is not located at the gesture start position. For example, when the user's hand is contacted at (e.g., when the user's hand or the particular object touches) the gearshift knob B, the controller 50 may be configured to determine that an intention to not perform the gesture, and may be configured to not recognize the gesture (e.g., may remain in the inactivation state or standby mode). The controller 50 may be configured to operate the feedback device 40 to jet or output the air along a moving path of the user's hand H in the gesture recognition region C1 when the input mode is activated. In other words, the controller 50 may be configured to operate the respective air jet devices 42 corresponding to a position of the user's hand H to jet the air when the user's hand is located at the gesture start position or moves in the gesture recognition region C1.

In the exemplary embodiment of the present invention, the gesture start position may be set with reference to the gearshift knob B, but it is not limited thereto. The gesture start position may be set with reference to a steering wheel or the like. In other words, the distance sensor 30 may be disposed at the steering wheel. In the gesture recognition technology, it is important for the user to recognize the gesture start position and the gesture recognition region.

As described above, according to an exemplary embodiment of the present invention, the gesture recognition may be started without additional buttons or motions by determining whether the user's hand is located at the gesture start position. Further, the tactile feedback may be provided to the user's hand when the user's hand is located at the gesture start position or moves in the gesture recognition region, thereby the user may recognize whether a gesture input is normally performed (e.g., is performed without error or erroneous function). Accordingly, it may be possible to prevent a driver's attention from being distracted.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

10: Lighting device
20: Imaging device
30: Distance sensor
40: Feedback device
50: Controller

What is claimed is:

1. A gesture recognition apparatus comprising:
an imaging device configured to photograph a gesture recognition region and generate image information;
a distance sensor configured to sense a particular object that approaches a gesture start position;
a controller configured to:
enter a gesture input mode when the particular object is located at the gesture start position for a predetermined time;
recognize a gesture by detecting the particular object based on the image information; and
provide feedback that indicates whether the particular object is located at the gesture start position and feedback that indicates whether the particular object is located in the gesture recognition region in the input mode,
wherein the gesture recognition region is set to be a predetermined area around a gearshift knob and
wherein the gesture start position is spaced apart form an upper portion of the gearshift knob in a vertical direction by a predetermined distance.

2. The gesture recognition apparatus of claim 1, wherein the imaging device includes a camera disposed to face the gearshift knob.

3. The gesture recognition apparatus of claim 1, wherein the distance sensor is disposed at an upper portion of the gearshift knob.

4. The gesture recognition apparatus of claim 1, wherein the feedback device includes one or more air jet devices configured to jet air toward the particular object to provide tactile feedback.

5. The gesture recognition apparatus of claim 4, wherein the air jet devices are disposed separately from each other around the gearshift knob based on a desired size of a jet region where the air is to be jetted.

6. The gesture recognition apparatus of claim 4, wherein a jet amount and a jet period of the air for indicating the gesture start position is different from the jet amount and the jet period of the air for indicating the gesture recognition region.

7. The gesture recognition apparatus of claim 4, wherein the feedback device is configured to jet the air along a moving path of the particular object located in the gesture recognition region.

8. The gesture recognition apparatus of claim 1, further comprising:
a lighting device configured to irradiate light toward the particular object.

9. The gesture recognition apparatus of claim 1, wherein the controller is configured to determine whether the particular object is located at the gesture start position using image information of the imaging device and distance information of the distance sensor.

10. A gesture recognition method, comprising:
photographing, by a controller, a gesture recognition region and generate image information;
sensing, by a sensor, a particular object that approaches a gesture start position;
entering, by the controller, a gesture input mode when the particular object is located at the gesture start position for a predetermined time;
recognizing, by the controller, a gesture by detecting the particular object based on the image information; and
providing, by the controller, feedback that indicates whether the particular object is located at the gesture start position and feedback that indicates whether the particular object is located in the gesture recognition region in the input mode,
wherein the gesture recognition region is set to be a predetermined area around a gearshift knob and
wherein the gesture start position is spaced apart form an upper portion of the gearshift knob in a vertical direction by a predetermined distance.

11. The method of claim 10, further comprising:
jetting, by an air jet device, air toward the particular object to provide tactile feedback.

* * * * *